United States Patent [19]

Cottingham et al.

[11] 4,110,506
[45] Aug. 29, 1978

[54] THERMOPLASTIC CONTROL COMPLEX

[75] Inventors: Hugh V. Cottingham, Upper Montclair; Joseph Scrocco, West Orange, both of N.J.

[73] Assignee: BHN Corporation, Upper Montclair, N.J.

[21] Appl. No.: 721,652

[22] Filed: Sep. 8, 1976

[51] Int. Cl.² .................. B29C 27/00; B32B 15/08; E04B 1/38
[52] U.S. Cl. .................. 428/138; 156/275; 156/380; 219/10.43; 428/198; 428/200; 428/209; 428/344; 428/349; 428/354; 428/913
[58] Field of Search ............... 156/275, 252, 309, 344, 156/380; 219/10.53, 10.43; 428/137, 138, 140, 172, 198, 200, 209, 346, 349, 354, 458, 913, 344

[56] References Cited
U.S. PATENT DOCUMENTS

| | | | |
|---|---|---|---|
| 1,216,654 | 2/1917 | Burke | 156/275 |
| 1,701,918 | 2/1929 | Gillis | 156/275 |
| 2,173,622 | 9/1939 | Crooks et al. | 156/275 |
| 2,241,312 | 5/1941 | Luty | 156/275 |
| 2,393,100 | 1/1946 | Gallay et al. | 156/275 |
| 2,742,390 | 4/1956 | Beck | 156/275 |
| 2,744,655 | 5/1956 | Vnuk | 156/275 |
| 2,951,006 | 8/1960 | Rubenstein | 156/84 |
| 3,049,465 | 8/1962 | Wilkins | 156/275 |
| 3,239,403 | 3/1966 | Williams et al. | 156/275 |
| 3,263,268 | 8/1966 | Flaherty | 156/275 |
| 3,348,640 | 10/1967 | Thompson et al. | 156/275 |
| 3,542,619 | 11/1970 | McManus | 156/275 |
| 3,733,231 | 5/1973 | Rutkowski et al. | 156/275 X |
| 3,756,881 | 9/1973 | Denman | 156/275 X |
| 3,996,402 | 12/1976 | Sindt | 428/140 |

Primary Examiner—William A. Powell
Assistant Examiner—M. G. Wityshyn
Attorney, Agent, or Firm—Blum, Moscovitz, Friedman & Kaplan

[57] ABSTRACT

A thermoplastic control complex for releasably securably bonding and debonding distinct elements together is provided. An elongated exothermic electrical conductor having a predetermined resistivity for each lengthwise unit thereof is provided with a thermoplastic resin selectively positioned along the length thereof. The complex is disposable between two distinct elements so that the thermoplastic resin is selectively transformed from a non-sticky substantially solid state to a substantially liquid state in response to a current being flowed through the exothermic conductor, whereby the thermoplastic resin, in the liquid state, effects wetting of the distinct elements for effecting subsequent releasable securable bonding of the elements together.

16 Claims, 7 Drawing Figures

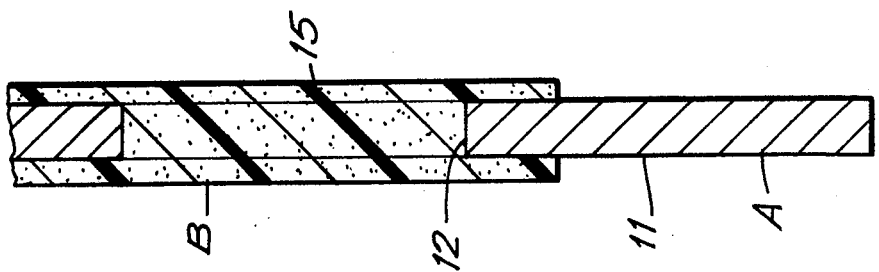
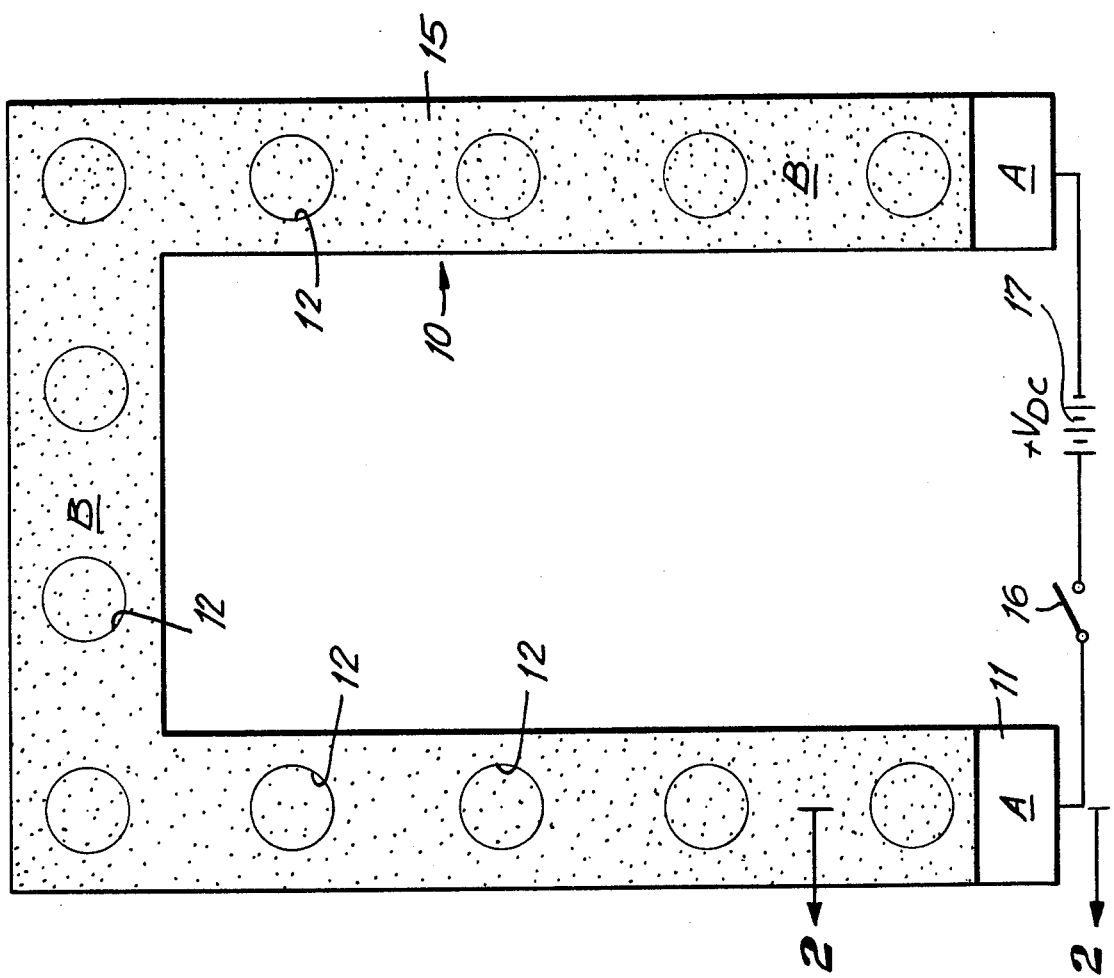

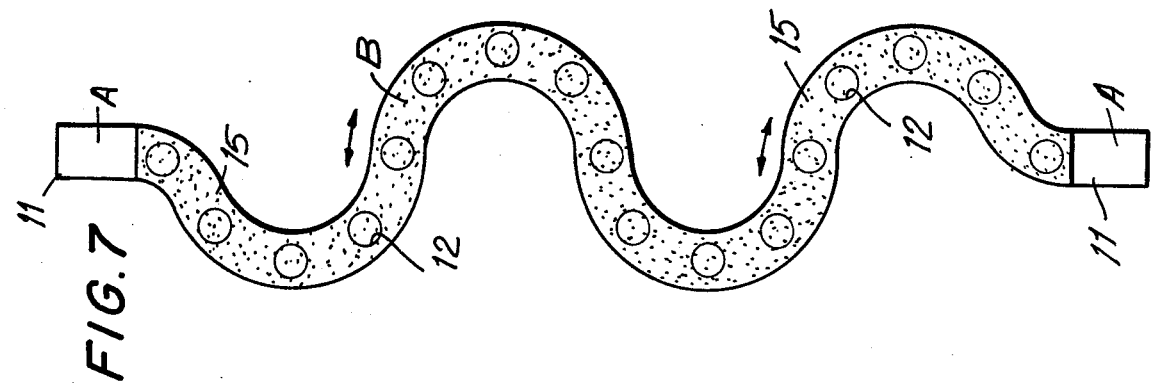
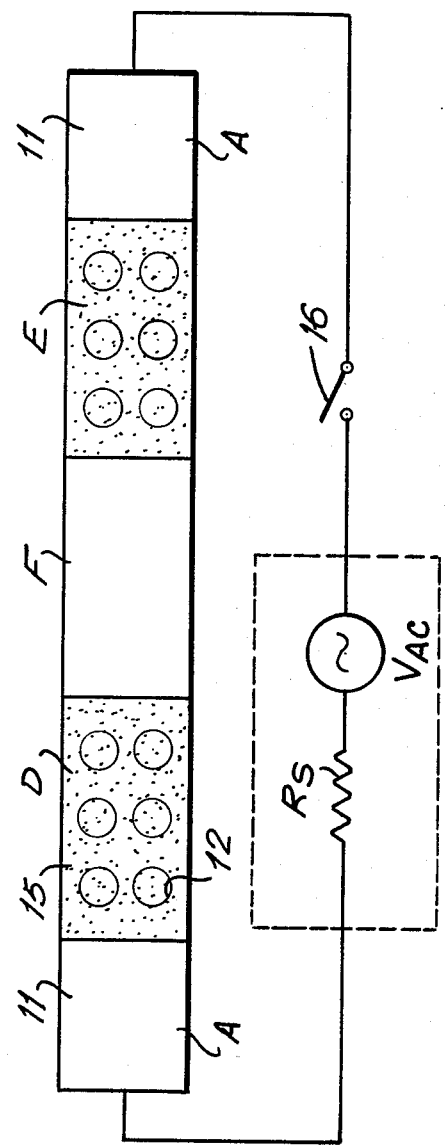
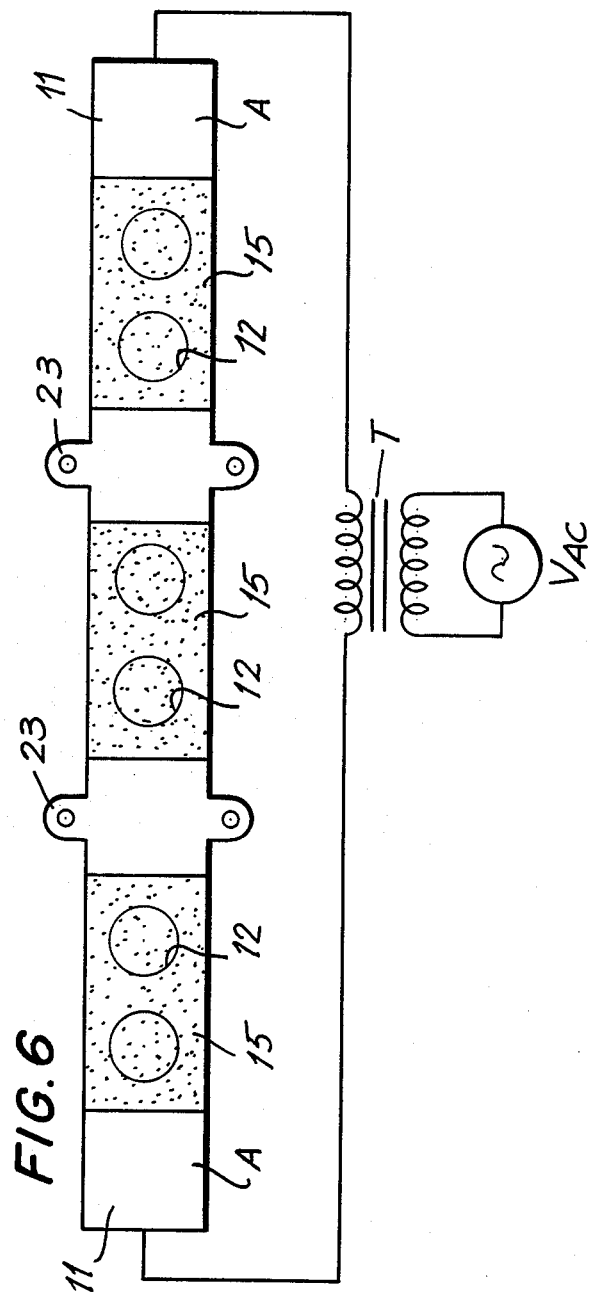

THERMOPLASTIC CONTROL COMPLEX

BACKGROUND OF THE INVENTION

This invention is directed to a thermoplastic control bonding and debonding complex for releasably securing distinct elements together, and in particular to the use of an exothermic carrier for controlling the adhesive bonding and debonding properties of a thermoplastic resin.

In recent years, thermoplastic resins commonly referred to as "hot melt glues", have become widely used due to their inherent ability to effect a bond rapidly. However, the inherent properties of thermoplastic resins that render same effective as an adhesive have made the use of such thermoplastic resins cumbersome and has limited the application of same to only a minimum of industrial uses.

Specifically, thermoplastic resins can only be applied to the surfaces of elements to be bonded together when the glue is heated to a substantially liquid state wherein same is able to be flowed onto the respective surfaces of the elements to be secured together. In its substantially liquid state, the resin is sticky and wets the surfaces of the elements to be bonded. Once exposed to ambient conditions, the temperature of the thermoplastic resin drops causing same to become substantially structural and acts as an adhesive bonding agent to fuse the wetted elements together. The term "open time" is utilized to define the time from which the thermoplastic resin is in a substantially liquid state and is capable of wetting a surface to the time when the thermoplastic resin is no longer sufficiently in liquid state to wet a surface. Stated otherwise, "open time" represents the total time available to apply a thermoplastic resin and effect bonding thereby. Thus, one difficulty heretofore encountered, in using thermoplastic resins as adhesives, is the short open time (typically 10 to 15 seconds) of such adhesives when applied by methods known in the prior art since the short open time limits the time available to achieve bonding using such adhesives, hence limiting the area of bonding that can be effected thereby.

Heretofore, all conventional methods of applying thermoplastic resins required a dispenser for dispensing quantities of the resin in a heated form wherein same is in a substantially liquid state to the members to be bonded. For example, hot melt guns have in themselves become expensive, intricate dispensers in order to sufficiently deliver the hot melt glue in a heated form to members that are to be adhesively bonded. As noted above, even if the resin is applied to the elements to be bonded under optimum conditions, the short open time requires that the bonding operation be instantly effected. Moreover, since thermoplastic resins will not efficiently wet surfaces that are cold, since the resin skims over upon contact with the cold surfaces, in order to take maximum advantage of the bonding strength of the resin, either the elements to be bonded must be warmed to optimum temperatures, which are often 250° to 350° F, or alternatively, the ambient conditions in which the bonding operation is effected must be sufficiently high as to avoid skimming of the resin upon contact with the element to be bonded. Finally, once effectively bonded by such adhesives, no method of debonding the respectively secured elements has heretofore been provided. Accordingly, a thermoplastic control complex for releasably securably bonding distinct elements together is desired.

SUMMARY OF THE INVENTION

Generally speaking, in accordance with the invention, a thermoplastic control complex for releasably securably bonding at least two distinct elements together is provided. The complex is comprised of an elongated electrically conductive exothermic carrier having a predetermined resistivity for each length thereof. A thermoplastic resin is selectively disposed along the length of the exothermic carrier. When the complex is positioned between two distinct elements to be joined, the thermoplastic resin is selectively disposed from a non-sticky substantially solid state to a substantially liquid state in response to a current being selectively flowed through the conductive carrier whereby the thermoplastic resin in the liquid state effects wetting of the distinct elements for effecting a subsequent releasable securing of the elements together.

By providing a plurality of high resistance zones along the lengthwise extent of the conductive carrier, the high resistance zones predetermine the resistivity of the exothermic carrier and hence assure that the temperature of said carrier is sufficiently raised in response to a current being selectively flowed therethrough to dispose the thermoplastic resin into said substantially liquid state at said high resistance zones.

Accordingly, it is an object of the instant invention to provide a novel method and apparatus for simplifying the use of thermoplastic resins as a bonding adhesive and/or caulking agent.

A further object of the instant invention is to provide a thermoplastic resin bonding and debonding complex for releasably securably bonding at least two distinct elements together.

Still a further object of the instant invention is to utilize to full advantage the unique bonding characteristics of thermoplastic resins.

Still a further advantage of the instant invention is to provide a thermoplastic control complex that is capable of simplifying the adhesive bonding, debonding and rebonding of distinct elements together.

Still a further object of the instant invention is to provide an improved exothermic conductor having high resistance zones for controlling the bonding and debonding properties of a thermoplastic resin.

Still other objects and advantages of the invention will in part be obvious and will in part be apparent from the specification.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a plan view of a thermoplastic adhesive bonding and debonding complex constructed in accordance with a preferred embodiment of the instant invention;

FIG. 2 is a sectional view taken along lines 2—2 of FIG. 1;

FIG. 5 is a plan view of a thermoplastic adhesive bonding and debonding complex constructed in accordance with a further embodiment of the instant invention;

FIG. 6 is a plan view of a thermoplastic adhesive bonding and debonding complex constructed in accordance with still another embodiment of the instant invention; and FIG. 7 is a plan view of a thermoplastic adhesive bonding and debonding complex constructed in accordance with still a further embodiment of the instant invention.

DETAILED DESCRIPTION OF THE PREFERRED EMBODIMENTS

Figure 3:
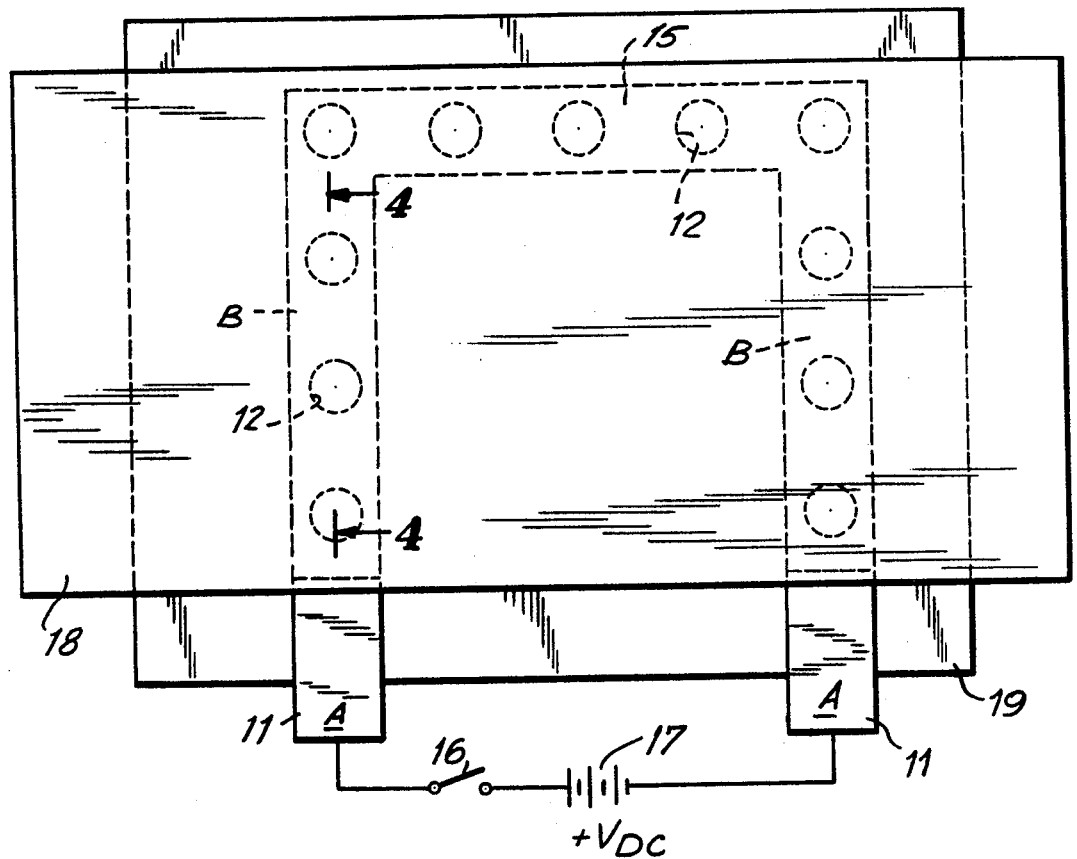
FIG. 3 is a plan view illustrating the operation of the thermoplastic adhesive bonding and debonding complex depicted in FIG. 1.

Reference is now made to FIGS. 1 and 2 of the drawings, wherein a thermoplastic control complex, generally indicated as 10, is depicted. The thermoplastic control complex is comprised of two basic elements, a metal alloy exothermic conductor 11 having a plurality of holes 12 disposed along the lengthwise extent thereof, and a thermoplastic resin 15, which resin is disposed on both sides of the metal alloy exothermic conductor. The area B of the exothermic conductor is covered with thermoplastic resin, and the areas A of the exothermic conductor are free of thermoplastic resin. The thermoplastic control complex is designed to utilize the thermoplastic resin 15 as a bonding agent with the bonding characteristics thereof controlled by varying the heat of the exothermic conductor on which the resin is disposed. Accordingly, a voltage source 17 is coupled at the respective ends A of the exothermic conductor not having the thermoplastic resin disposed thereon. Accordingly, if switch 16 is closed, a voltage is applied across the exothermic conductor, and depending upon the resistance of the exothermic conductor, a predetermined amount of current is flowed through the conductor to thereby effect a heating of same and a likewise heating of the thermoplastic resin. If the temperature of the thermoplastic resin is sufficiently raised it is melted into a substantially sticky liquid state and thereby wets a surface that is to be bonded. Once the voltage ceases to be applied across the exothermic conductor, current ceases to be flowed therethrough thereby resulting in a rapid drop in the temperature of the exothermic conductor, and a likewise lowering of the temperature of the thermoplastic resin to transform same into a substantially non-sticky solid state wherein the resin effects bonding together of the elements that the resin was flowed onto when the resin was in a substantially liquid state. In order to effect debonding of the elements, a potential is once again applied across the conductor to repeat the melting of the thermoplastic resin and thereby transform same into its substantially liquid state whereby any elements that had been adhesively bonded thereby can readily be separated.

Figure 4:
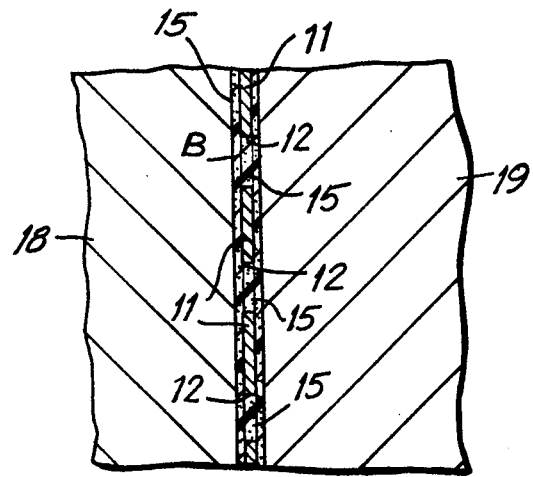
FIG. 4 is a sectional view taken along lines 4—4 of FIG. 3.

Referring specifically to FIGS. 3 and 4, the manner in which the thermoplastic control complex is utilized to bond two distinct elements together is depicted, like reference numerals being utilized to denote like elements depicted above. Additionally, in order to adhesively secure a first wood block 18 to a second wood block 19 by use of the thermoplastic adhesive complex, the following operation is required. First, the complex 10 is sandwiched between two wooden blocks 18 and 19 with the end portions A of the exothermic conductor not having thermoplastic resin thereon extending from between the two blocks. A voltage source 17 is coupled to the end portions A of the exothermic conductor and the switch 16 is closed to selectively apply a voltage across the conductor 11. The voltage thereby effects the flowing of current through the exothermic conductor thereby heating the thermoplastic resin to an optimum operating temperature wherein same is transformed into a substantially sticky liquid state so that the resin flows onto the surface of the blocks 18 and 19 in contact therewith and thereby wets same. After a predetermined period of time that is sufficient to permit all of the thermoplastic resin to be melted to a substantially liquid state, switch 16 is opened thereby terminating the voltage applied across the exothermic conductor and hence stopping the flow of current therethrough. Accordingly, the temperature of the exothermic conductor rapidly lowers and effects a likewise lowering of the temperature of the thermoplastic resin to thereby transform same back into a structural relatively solid state wherein the resin acts as a strong adhesive bonding agent between the respective blocks. As is specifically depicted in FIG. 4, first wood block 18 is thereby bonded to the second wood block 19 by the structural property of the thermoplastic resin. It is noted that the holes 12, in addition to defining high resistance zones, which zones are hereinafter explained in detail, also permit the thermoplastic resin, when melted, to flow through the holes, thereby directly bonding wood block 18 to wood block 19. As will be detailed hereinafter, the bond between the blocks 18 and 19 is considerably stronger than that heretofore obtainable utilizing hot melt glues applied by conventional applicators. Moreover, if the positioning of the block 18 with respect to the block 19 after bonding, is unacceptable, or alternatively it is desired to separate the respective blocks, it is only necessary to once again apply a voltage across the exothermic conductor and thereby effect a melting of the thermoplastic resin to a substantially liquid state, which thereby permits the block 18 to be moved with respect to the block 19, or if desired, completely separated therefrom. Thus, the thermoplastic control complex of the instant invention is particularly characterized by an ability to effect a strong adhesive bond between distinct elements that is clearly reversable and hence permits debonding with substantially the same facility that bonding is effected.

The configuration of the metal alloy exothermic conductor is critical in establishing a first temperature wherein the thermoplastic resin is in a substantially solid state and for obtaining a second temperature wherein the thermoplastic resin is in a substantially liquid state in order to effect the bonding and debonding described hereinabove. Although the heat generated by the exothermic conductor is generated by the application of a potential across same, it is the resistive property of the conductor that permits same to operate as an efficient exothermic element. It is imperative to the operation of the instant invention that the resistance of the conductor carrying the thermoplastic resin be precisely controlled in terms of quantity and location. Accordingly, the instant invention utilizes selectively disposed high resistance zones along the lengthwise extent of the exothermic conductor to thereby determine the absolute quantity of resistance and additionally the location in the exothermic conductor at which the points of highest resistance, and hence greatest heating, are to occur. Specifically, high resistance zones are created by the reduction in the cross-sectional mass of the exothermic conductor by incorporating holes in the shape of circles, elipses, rectangles or any other geometric or nongeometric shapes in the conductor or by selectively increasing and decreasing the thickness of the conductor along the lengthwise extent thereof. As illustrated in FIG. 1, the holes 12 formed along the conductor 11 define high resistance zones in the adjacent portion of the conductor surrounding said holes. The higher resistance zones at the points along the length of the conductor are defined by the reduced cross-section and are based on the following relationship between resistance and the physical characteristics of the conductor:

$$R = KL/A$$

wherein $R$ is the resistance in ohms; $K$ is the resistivity constant of the metal or metal alloy of which the resistive element is composed; $A$ is the cross-sectional area of the conductor at a predetermined lengthwise position; and $L$ is the length of the conductor. Thus, wherever holes are disposed along the lengthwise extent of the conductor, the resistance of the conductor is increased, thereby in addition to increasing the total resistance of the conductor, also localizing the exothermic heating at the positions along the conductor where the high resistance zones are disposed.

In addition to the high resistance zones in the exothermic conductor, the alloy of the resistive element is also relevant in controlling the temperature characteristic of the exothermic conductor. Properties which differ among alloys are resistivity, tensile strength, melting point, temperability and thermal coefficient of expansion. Of critical importance to the thermoplastic control complex is the resistivity of the alloy since the resistivity property governs the power dissipated by the complex. Since the power is a function of the square of the current times the resistance ($P = I^2R$), if the resistance is very low, in order to dissipate enough power to effect sufficient exothermic heating, an extremely large current must be flowed through the conductor in order to effect the necessary heating. Nevertheless, a disadvantage of high currents is the considerable magnitude and expense of equipment that is capable of supplying same. Alternatively, if the resistance of the conductor is inherently high, the amount of current required to dissipate a sufficient amount of power to heat the exothermic conductor and hence the thermoplastic resin to a temperature at which the resin is changed from a substantially solid state to a substantially liquid state is greatly reduced. Thus, by selecting materials of inherent high resistance power supplies that yield a high voltage and a low current can be utilized in combination with the thermoplastic control complex to operate same in an effective manner. Additionally, the melting point of the alloy must be taken into account to assure that same is sufficiently high as to avoid the power dissipated by the conductor generating sufficient heat to melt the conductor. Nevertheless, the exothermic conductor is not limited to materials having an inherently high resistance since the exothermic characteristics are based on the inherent resistivity characteristic of the material used to form the conductor and the resistance zones that can be readily formed therein by reducing the cross-sectional mass of the conductor in the manner described above.

The thermoplastic resin 15 can be any one of the hot melt adhesives that are currently available. For example, ethylene vinyl acetate copolymer (EVC), chlorinated resin; Poly-amides; and other thermoplastic resins are suitable for use in the instant complex since same have good bonding properties. Nevertheless, different thermoplastic resins have better aging, hydrating and temperature strength loss coefficient properties as well as other properties that might make a specific thermoplastic resin more particularly suitable for a specific application. The thermoplastic resin can be secured to, or mated to, the exothermic conductor by any one of several techniques. For example, the thermoplastic material may be coated directly onto the exothermic conductor by either a dip or extrusion process. A second technique that has proved effective is to cold roll, hot roll or press the thermoplastic resin to the exothermic conductor. Other contemplated methods of mating the thermoplastic resin to the conductor include spraying the thermoplastic resin onto the conductor.

In an actual embodiment of the instant invention, the thermoplastic control complex was formed of a 16 foot length of mill steel having a width of 0.265 inches and a thickness of 0.0045 inches. The conductor includes 914 holes of a diameter of 0.175 inches on centers of 0.210 inches to define a resistivity of 0.5 ohms/foot (total 8 ohms). The thickness of the thermoplastic resin layer on each side of the conductor is 0.031 inches yielding a total thickness of 0.0665 inches. The operating voltage is 80 volts, power dissipation is 800 watts, and the flow point of the thermoplastic is 300° F.

Finally, as noted above, the complex is energized by applying a potential across the resistive element. The potential causes a current to flow through the element in accordance with ohms law:

$$I = V/R$$

where $I$ is the current in amperes; $V$ is the voltage in volts; and $R$ is the resistance in Ohms. Thus, the physical quantity that effects the change of state of the thermoplastic resin is the power dissipation by the conductor, which power dissipation follows the following formula:

$$P = V^2/R$$

where P is the power in watts. Thus, the power is directly dependent on two variables, potential and resistance. Nevertheless, since the resistance at the time that bonding is to be effected by the thermoplastic control complex is fixed, the only variable is the applied potential. Thus, the degree of heating produced by the resistive element is controlled by the change in voltage and hence the amount of current flowed through the conductor. Thus, testing has shown that the power required to melt the thermoplastic resin is linearly related to the cross-sectional area of the exothermic conductor, the specific heat of the exothermic conductor and the flow temperature of the plastic resin. Moreover, tests have also shown that the voltage required to transform the thermoplastic resin from a substantially solid state to a liquid state is linearly related to the length of the coated portion of the conductor being energized.

Reference is now made to FIG. 5, wherein a thermoplastic adhesive complex constructed in accordance with the instant invention and illustrating two further features of the instant invention is depicted, like reference numerals being utilized to denote like elements described above. The exothermic conductor 11 is provided with two distinct groups of smaller holes 12 to define distinct heat resistance zones. The thermoplastic resin 15 is disposed on both sides of the conductor at only the portions defined by the holes 12. By utilizing such a configuration, the complex provides two distinct bonding areas D and E along the exothermic conductor. Thus, when current is flowed through the exothermic conductor, only the areas D and E wherein the holes define the high resistance zones effect power dissipation. Moreover, the remaining lengthwise portions of the exothermic conductor 11 such as the area F disposed between the two bonding areas D and E is not heated and hence defines a relatively cool zone even when the current is flowed through the exothermic conductor to transform the thermoplastic resin from a substantially solid state to a substantially liquid state. The ability to provide zones of heating and zones of non-heating on the same exothermic conductor permit the use of the complex to effect intricate adhesive functions by permitting the heat dissipation required to effect such bonding and debonding operations to be localized to the high resistance area at which the thermoplastic resin is disposed on the exothermic conductor.

The second feature illustrated in FIG. 5 is directed to an alternate method of providing a control potential to the exothermic conductor to effect bonding and debonding operations. As is detailed in FIGS. 1 through 4, simple DC operation wherein a DC voltage battery is used to produce a sufficient current can be utilized to effect the operation described above. However, as is illustrated in FIG. 5, the applied potential can be an AC signal of a fixed value or of a variable value. When the AC voltage applied to the exothermic conductor is selectively variable, there need be no limiting resistance since the fixed resistance of the complex permits the AC voltage to be varied in order to select the necessary amount of current to be flowed in the conductor. Alternatively, if the AC voltage applied is a fixed AC voltage, such as that which is commercially available, a selected resistor $R_S$ is required in order to select the effective resistance across which the fixed potential is applied which changes the amount of current flowed through the exothermic conductor.

Reference is now made to FIG. 6, wherein a further thermoplastic control complex illustrating two further features of the instant invention is depicted, like reference numerals being utilized to denote like elements depicted above. The complex is provided with discrete tabs 23 along the length thereof. Such tabs can be utilized to tack a bonding strip to one of the members to be bonded when the members are vertically disposed. Alternatively, instead of utilizing tabs, tacks or staples can be hammered through the holes in the complex in order to merely hold the complex in a vertical position until a bonding operation is effected. For example, if a thermoplastic control complex of the type to which the instant invention is directed were utilized to secure a member to an upstanding wall, the elongated complex could be secured to the wall by one or two staples in order to assure that same will remain fixed. Thereafter, the member to be mounted to the wall can be held in position while current is flowed through the complex until the thermoplastic resin of the complex flows onto the surfaces to be bonded.

Additionally, due to the importance of controlling the potential applied to the exothermic conductor in order to effect bonding and debonding operations, the embodiment illustrated in FIG. 6 is energized by a simple transformer coupling T. Since the total output power of a transformer must equal the total input power of the transformer, when a source of high AC voltage is available, a simplified transformer coupling of the type depicted in FIG. 6 will assure that a sufficient voltage will be applied across the thermoplastic adhesive complex and thereby assure that a sufficient current will be flowed through the exothermic conductor to effect a bonding and/or debonding operation.

Also, as was noted above, the physical configuration of the complex is not limited to any predetermined configuration. In its simplest form, the complex can be a linear strip. Additionally, as illustrated in FIGS. 1 through 4, the complex can be formed as a U-shaped element in order to assure that the contact portions to which the voltage source is to be coupled are proximate to each other. Additionally, as depicted in FIG. 7, the complex can be formed in an S configuration in order to reduce the thermal linear expansion effected by the exothermic heating which occurs during the bonding and debonding processes. The use of S shaped complexes changes the expansion vector by 90° and clearly reduces the amount of expansion along the linear length of the complex. Accordingly, the number of S configurations in any linear length would determine the amount of reduction in expansion that would be affected. Moreover, since precise zones of heating and non-heating can be effected by disposing the high resistance zones along only the horizontal portions of the S configurations, substantial linear expansion can be deflected in the horizontal direction if so desired.

Accordingly, the thermoplastic adhesive complex of the instant invention clearly improves on the use of hot melt adhesives for bonding purposes and additionally permits debonding of members bonded by the hot melt adhesive, a feature heretofore unavailable in the prior art. By permitting the thermoplastic resin disposed on the exothermic conductor to be selectively heated for a desired amount of time, the open time of the adhesive is thereby infinite and hence has no bearing on the use of such thermoplastic resins. Moreover, when hot melt adhesives of the type utilized in the prior art were applied to a cold surface, insufficient wetting of the surface occurred, thereby reducing the strength of the bond which eventuated. The thermoplastic adhesive complex of the instant invention not only assures that the thermoplastic resin is sufficiently heated to a desired temperature, but more importantly that sufficient heat is generated to assure that the area being glued on the surface in contact with the heating zone of the exothermic conductor is likewise heated, thereby further guaranteeing that the adhesives will sufficiently wet the surfaces to be bonded and hence provide a strong adhesive bond.

It is further noted that the thermoplastic control complex of the instant invention can be utilized as an effective caulking or sealing agent, thereby taking advantage of the inherent properties of the thermoplastic resins.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A thermoplastic control complex for releasably securably bonding at least two distinct elements together comprising in combination, an elongated electrically conductive exothermic carrier having a predetermined resistivity for each lengthwise unit thereof, said conductive carrier including at least one discrete high resistance zone, each said high resistance zone being disposed at a predetermined position along the lengthwise extent thereof, each said high resistance zone being adapted in response to a current flow being effected through said conductive exothermic carrier to be heated to an elevated temperature level relative to the temperature level of those portions of said exothermic carrier that are free of heating zones formed therein, and a thermoplastic resin selectively positioned at each of said high resistance zones along the length of said exothermic carrier, said complex being adapted to be disposed between two distinct elements so that thermoplastic resin disposed at said high resistance zones is selectively transformable from a non-sticky substantially solid state to a sticky substantially liquid state in response to said high resistance zone being heated to said elevated temperature level whereby said resin, in substantially sticky liquid state, effects wetting of the distinct elements for effecting subsequent releasable bonding of the elements together.

2. A thermoplastic control complex as claimed in claim 1, wherein said conductive carrier has a first predetermined mass per unit length, each said high resistance zone being defined by the mass of said conductive carrier being reduced to thereby increase the impedance of said conductive carrier at said portions of said conductor having a reduced mass to an impedance level that is higher than the impedance level of the remaining portions of said conductor not having said reduced mass high resistance zones formed thereon.

3. A thermoplastic control complex as claimed in claim 2, wherein each of said high resistance zones are determined by changes in the cross-sectional dimension of said carrier at positions along the lengthwise extent thereof.

4. A thermoplastic control complex as claimed in claim 1, wherein said exothermic carrier includes a plurality of high resistance zones defined by reductions in the cross-sectional dimension of said carrier along the lengthwise extent thereof so that the non-reduced cross-sectional portions of said carrier define low-resistance zones, said thermoplastic resin being disposed proximate to said high resistance zones to define bonding areas along the length of said complex.

5. A thermoplastic control complex as claimed in claim 1, wherein said conductive exothermic carrier is a substantially flat elongated element having a plurality of openings formed through said element along the lengthwise extent thereof, each of said openings defining a high resistance zone in said element and further defining an opening through which said distinct elements can be releasably secured by said resin when said resin is in a substantially solid state.

6. A thermoplastic control complex as claimed in claim 5, wherein the ends of said elongated exothermic conductive carrier are free of thermoplastic resin.

7. A thermoplastic control complex as claimed in claim 6, wherein said elongated carrier is in a substantially U-shaped configuration, thereby disposing the respective ends of said carrier proximate to each other for facilitating the electrical connection thereof.

8. A thermoplastic control complex comprising an elongated exothermic conductor, said exothermic conductor having a plurality of reduced cross-sectional areas discretely positioned along the lengthwise extent thereof, a plurality of thermoplastic resin areas formed on said conductor at said reduced cross-sectional areas, at least the respective ends of said conductor being free of said reduced cross-sectional areas and free of thermoplastic resin areas, and potential means for applying a potential across said conductor to thereby flow a current therethrough and elevate said reduced cross-sectional areas and hence said thermoplastic resin areas formed on said conductor at said reduced cross-sectional areas to a temperature level higher than the portions of said conductor not having said reduced cross-sectional areas.

9. A thermoplastic control complex as claimed in claim 8, wherein said conductor is a thin substantially flat conductor, and said reduced cross-sectional areas are defined by openings of predetermined size formed along the lengthwise extent of said conductor.

10. A thermoplastic control complex as claimed in claim 8, wherein said potential means for applying a potential across said conductor is a DC supply means.

11. A thermoplastic control complex as claimed in claim 8, wherein said potential means is an AC supply means.

12. A thermoplastic control complex as claimed in claim 8, wherein said elongated conductor is a substantially U-shaped configuration for disposing the respective ends of said conductor proximate to each other for facilitating connection of said potential means thereto.

13. A thermoplastic control complex as claimed in claim 8, wherein at least a portion of said elongated exothermic conductor having said openings therein is formed in a S-shaped configuration.

14. A thermoplastic control complex sandwich wherein two distinct elements are releasably securably bonded together comprising in combination an elongated exothermic conductor having a plurality of high resistance zones specifically disposed along the lengthwise extent thereof, and thermoplastic resin selectively positioned along the length of said exothermic carrier at positions proximate to said high resistance zones, said remaining portions of said exothermic conductor that are free of said high resistance zones also being free of said thermoplastic resin, said thermoplastic resin and conductor on which same is positioned being sandwiched between said distinct elements and releasably securably bonding said elements together, said thermoplastic resin at said high resistance zones being transformable to a substantially non-adhesive state in response to being heated by the application of a voltage across said conductor to thereby permit said distinct elements to be separated from each other.

15. A thermoplastic control complex sandwich as claimed in claim 14 wherein each of said high resistance zones are determined by changes in the cross-sectional area of said carrier at positions along the lengthwise extent thereof.

16. A thermoplastic control complex for releasably securably bonding at least two distinct elements together comprising in combination, an elongated electrically conductive exothermic carrier having a predetermined resistivity, said exothermic carrier including a plurality of high resistance zones disposed at predetermined positions along the lengthwise extent of said conductive carrier, said exothermic carrier being adapted to be heated to a first temperature level in response to a predetermined current flow being effected therethrough, said high resistance zones being elevated to a second temperature level that is higher than said first temperature level in response to said predetermined current flow through said carrier, and a thermoplastic resin selectively positioned on said exothermic carrier at said high resistance zones when said predetermined current flow is effected through said carrier to thereby be transformed from a non-sticky substantially solid state to a sticky substantially liquid state whereby said resin, in said sticky substantially liquid state, effects wetting of the distinct elements for effecting the subsequent releasable bonding of the elements together.

* * * * *